US011002591B2

(12) United States Patent
Buchmann et al.

(10) Patent No.: US 11,002,591 B2
(45) Date of Patent: *May 11, 2021

(54) LABORATORY BALANCE WITH A WEIGHING CHAMBER REAR WALL OF MODULAR CONSTRUCTION

(71) Applicant: Mettler-Toledo GmbH, Greifensee (CH)

(72) Inventors: Alice Buchmann, Uster (CH); Beat Meister, Naenikon (CH); Marc Zehnder, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 152 days.

This patent is subject to a terminal disclaimer.

(21) Appl. No.: 16/381,094

(22) Filed: Apr. 11, 2019

(65) Prior Publication Data

US 2019/0316954 A1    Oct. 17, 2019

(30) Foreign Application Priority Data

Apr. 17, 2018  (EP) ..................................... 18167731

(51) Int. Cl.
*G01G 21/23*  (2006.01)
*G01G 21/28*  (2006.01)

(52) U.S. Cl.
CPC ........... *G01G 21/286* (2013.01); *G01G 21/23* (2013.01)

(58) Field of Classification Search
CPC .............................. G01G 21/286; G01G 21/23
USPC ......................................................... 177/180
See application file for complete search history.

(56) References Cited

U.S. PATENT DOCUMENTS

| 4,893,686 | A | 1/1990 | Chretien et al. |
| 6,849,809 | B2 * | 2/2005 | Luchinger ............ G01G 21/286 177/180 |
| 7,193,164 | B2 * | 3/2007 | Olesen ................. G01G 21/286 177/180 |
| 7,834,278 | B1 * | 11/2010 | Zeiss .................... G01G 21/286 177/180 |
| 8,294,046 | B2 | 10/2012 | Lüchinger et al. |
| 9,121,749 | B2 | 9/2015 | Izumo et al. |
| 2006/0231298 | A1 * | 10/2006 | Luechinger .......... G01G 21/286 177/180 |
| 2010/0288660 | A1 * | 11/2010 | Luchinger ............ G01G 21/286 206/305 |

FOREIGN PATENT DOCUMENTS

DE    202006011576 U1    11/2006

* cited by examiner

*Primary Examiner* — Jacques M Saint Surin
(74) *Attorney, Agent, or Firm* — Standley Law Group LLP; Jeffrey S. Standley; Stephen L. Grant

(57) ABSTRACT

A laboratory balance (1) has a base body (2), a weighing chamber (10) with a weighing chamber floor (3), a weighing chamber rear wall (4), and a draft shield (5,5',5"). The draft shield has a top wall (6), a first side wall (7), a second side wall (8) arranged parallel to the first side wall, and a front wall (9). The weighing chamber floor, the draft shield and the weighing chamber rear wall act together to enclose the weighing chamber. The weighing chamber rear wall has a modular construction, with at least a base module (15) and a top module (16,16',16"). The base module is connected to the base body, and the top module is connected to the top wall of the draft shield.

17 Claims, 9 Drawing Sheets

LABORATORY BALANCE WITH A WEIGHING CHAMBER REAR WALL OF MODULAR CONSTRUCTION

CROSS-REFERENCE TO RELATED APPLICATIONS

This application makes a claim of priority to European Patent Application No. 18167731.1, filed on 17 Apr. 2018, which is incorporated by reference as if fully recited herein.

TECHNICAL FIELD

The claimed invention relates to a laboratory balance with a weighing chamber rear wall which can be configured in different heights by stacking at least two modular wall elements on top of each other.

BACKGROUND ART

The invention relates to a balance that is used to weigh small objects with a very high precision of, typically, a fraction of a milligram. The sensitivity which enables a balance to measure weight so precisely also makes the balance susceptible to any air circulation in the area of the weighing pan. The weighing pan and the space above it are therefore separated from the ambient environment by an enclosure which is commonly referred to as a draft shield. The space inside the draft shield is referred to as the weighing chamber. The term laboratory balance in the present context means any high-precision weighing instrument with a draft-shield-enclosed weighing chamber. Such balances are used in chemical and pharmaceutical laboratories, industrial quality control, the jewelry trade, numismatics, weighing of air-pollution filters, and many other applications.

While a draft shield keeps out drafts of ambient room air, the weighing accuracy and speed of operation of a laboratory balance may still be negatively affected by temporary turbulence when a door of the draft shield is opened, and by convective air currents inside the weighing chamber due to heat dissipation from the electrical and electronic parts of the balance. These air movements inside the draft shield tend to be stronger and take longer to subside the larger the volume, in particular the height, of the weighing chamber. To achieve the best accuracy and operating speed with a laboratory balance, the volume, and in particular the height, of the weighing chamber should therefore only be as large, and in particular as tall, as is necessary to accommodate the objects that are being weighed.

To meet the need for balances whose weighing chamber height matches the height of the samples to be weighed, the present state of the art offers balances with height-adjustable draft-shielding enclosures. In U.S. Pat. No. 4,893,686, a draft protection device is proposed with two or more hollow bodies that surround the weighing pan and can be telescopically slid inside each other to adjust the draft protection device to a desired height which is maintained by a locking device. The open top of the telescopic draft shield can be covered with a lid if necessary. With the draft protection device according to U.S. Pat. No. 4,893,686, the weighing object is brought to, and removed from, the weighing pan through the top opening of the draft shield, which makes this type of draft shield undesirable for the delicate manipulation of small samples. Furthermore, placing the lid on or off the draft shield causes a gust of air turbulence inside the weighing chamber. Due to these drawbacks, the practical applications of the telescopic draft shield of U.S. Pat. No. 4,893,686 remain largely limited to balances of a lower class of precision than the laboratory balances described above.

Another state-of-the-art draft protection device for a laboratory scale, described in US 2010/0288566 A1, has planar panels, i.e. a rear wall, a front wall, two sidewalls, a top cover, and a floor, which together enclose a weighing chamber. The front wall and sidewalls are suspended from the edges of the top cover and overhang the front and sides of a base housing of the balance. The top cover with the suspended front- and sidewalls can be raised and lowered, with the front- and sidewalls sliding up and down over the front and sides of the base housing, whereby the height of the weighing chamber can be adjusted. Obviously, the range of downward movement ends at the point where the bottom edges of the front- and sidewalls reach the level of the work surface on which the balance is set up. Thus, the possible range of height adjustment of the weighing chamber with the draft protection device described in US 2010/0288566 A1 is rather limited.

According to a further solution, which is proposed in US 2013/0068542, the ceiling height of the weighing chamber is reduced by installing a horizontal partitioning panel, for example a glass plate inside the draft shield compartment, whereby the space inside the draft shield compartment is divided into the actual weighing chamber at the bottom and a stagnant air space at the top. This concept has the disadvantage that the horizontal partitioning panel obstructs access to the weighing compartment from the top.

In view of the aforementioned disadvantages of the height-adjustable weighing chambers of the prior art, the applicants searched for a new solution that would allow a laboratory balance of a given base model to be equipped, either at the factory or through field installation, with draft shield devices of different standardized heights. This differentiation in height affects the vertical walls, i.e. the front-, rear- and sidewalls of the weighing chamber. It occurred to the inventors that economies in manufacturing, inventory and delivery logistics could be achieved in particular by a modular design of the rear wall of the weighing chamber, so that weighing chamber rear walls of different heights could be assembled by stacking modular wall elements on top of each other.

The special attention to the weighing chamber rear wall over the front- and sidewalls of the weighing chamber is due to the fact that the rear wall is manufactured of metal, while the draft shield walls are configured as glass panels, as the logistics of manufacturing rear walls of different heights are significantly more complicated than providing glass panels of different dimensions.

Thus, the object of the present invention is to provide a laboratory balance with a weighing chamber rear wall which can be configured in different heights by stacking modular wall elements on top of each other.

SUMMARY

This task is solved by a laboratory balance with a weighing chamber rear wall of modular construction in accordance with the independent claims. Advantageous embodiments and detail features of the invention are set forth in the dependent claims.

A laboratory balance of the type to which this invention relates has a base body and a weighing chamber with a weighing chamber floor and a weighing chamber rear wall. In addition to the weighing chamber rear wall, there is a draft shield with a top wall, a first side wall, a second side wall extending parallel to the first side wall, and a front wall, wherein the weighing chamber floor, the draft shield and the weighing chamber rear wall together enclose the weighing chamber. According to the invention, the weighing chamber rear wall is of modular construction, i.e., configured as an assembly of two or more modular elements that include at least a base module and at least one top module, wherein the base module is connected to the base body and the top module is connected to the top wall of the draft shield.

The terms front, rear, side, top, floor within the present context relate to the weighing chamber as it presents itself to a user of a balance that is set up in its operating condition. The spatial directions and dimensions are accordingly defined as width, height and depth as seen by a person sitting in front of the balance.

According to a first embodiment of the invention, the top module is selectable from a plurality of available top modules of different heights. The base module and the selected top module together form the weighing chamber rear wall. Thus, weighing chamber rear walls of different heights can be assembled as required for the intended use of the laboratory balance.

According to a preferred embodiment, the base module and the top module together form the weighing chamber rear wall having at least one smooth surface in vertical direction. Consequently, the modules form the weighing chamber rear wall with a continuous surface in vertical direction. However, in horizontal direction the weighing chamber real wall may show edges.

In preferred embodiments of the invention, the width of the base module, i.e. the horizontal dimension transverse to the viewing direction of a user of the balance, is at least equal to or greater than the width of the base body.

It is envisioned, but without thereby implying a limitation, that the base body in preferred embodiments has the shape of a flat, low-profile horizontal box whose largest dimensions (in the normal operating position of the laboratory balance) are depth and width (in the terminology that has been introduced above), and that the weighing chamber rear wall is likewise of a flat configuration but its main extensions are in the directions of height and width. It is envisaged to locate components such as calibration weights, cables for conducting power and signals, motors, etc., within the base body. In preferred embodiments of the invention, the base module of the weighing chamber rear wall is positioned with its height and width oriented at right angles to the depth direction of the base body. Such an arrangement provides the necessary framework for receiving and supporting the draft shield thereby creating a weighing chamber of definite volume.

In preferred embodiments of the invention, the base module and the top module have matching surface profiles in the direction of their widths. Particularly, the base module and the top module have identical front surface profiles in cross-sectional planes that run parallel to the weighing chamber floor. Aforementioned feature provides perfect alignment between the base module and the top module besides making the weighing chamber rear wall appear more even and aesthetically appealing.

The top module is preferably positioned above, and vertically aligned with, the base module. Alternatively, the top module could be positioned in front of the base module such that the top module overlaps or overhangs part of the frontal surface of the base module. Such an arrangement is desirable especially when the balance is used in applications that require smaller weighing chamber volumes offering higher resolutions.

In another advantageous embodiment of the inventive concept, the weighing chamber rear wall includes at least one additional module arranged vertically in between the base module and the top module, so that the top module, the at least one additional module and the base module together form the weighing chamber rear wall. The possibility to include an additional module aids in adapting the balance to suit applications that require larger weighing chamber volumes.

Preferably, the base module, the at least one additional module and the top module have matching surface profiles in the direction of their widths. Particularly, the base module, the additional module, and the top module have identical front surface profiles in cross-sectional planes that run parallel to the weighing chamber floor. Aforementioned feature provides perfect alignment between the base module, additional module, and the top module besides making the weighing chamber rear wall appear more even and aesthetically appealing.

Preferably, the base module, the at least one additional module and the top module together form the weighing chamber rear wall, whereby the weighing chamber wall contain at least one smooth surface in vertical direction. Advantageously the weighing chamber rear wall consists of at least one smooth surface in vertical direction. However, the weighing chamber rear wall may consist of more than one smooth surfaces in vertical direction.

In the configuration of the weighing chamber rear wall with base module, additional module and top module, the at least one additional module and/or the at least one top module can be selectable from a plurality of available additional modules and/or top modules of different heights. Advantageously, the at least one additional module and the at least one top module are designed so that each of the top modules fits equally on top of the at least one additional module as it fits on top of the at least one base module. The number of weighing chamber rear walls of different heights which can be assembled is thereby further expanded. For example, with a modular design of the weighing chamber rear wall with one base module, one additional module and three top modules of different heights, a total of six weighing chamber rear walls of different heights could be assembled to optimally satisfy the different requirements for the intended uses of the laboratory balance.

Advantageously, the design of the laboratory balance according to the invention includes a plurality of draft shields of different heights that match, respectively, the heights of the plurality of weighing chamber rear walls of different heights which can be assembled with the base module and the available top modules, with either no additional module or, if available, the one or more additional modules inserted between the base module and the top module. The draft shield of one height is replaceable by a draft shield of a different height that commensurate with the total height of the weighing chamber rear wall.

BRIEF DESCRIPTION OF THE DRAWINGS

The laboratory balance with the weighing chamber rear wall according to the invention will be described hereinafter through embodiments shown schematically in the drawings, wherein identical parts are identified with identical reference numbers and wherein.

DETAILED DESCRIPTION

Figure 1:
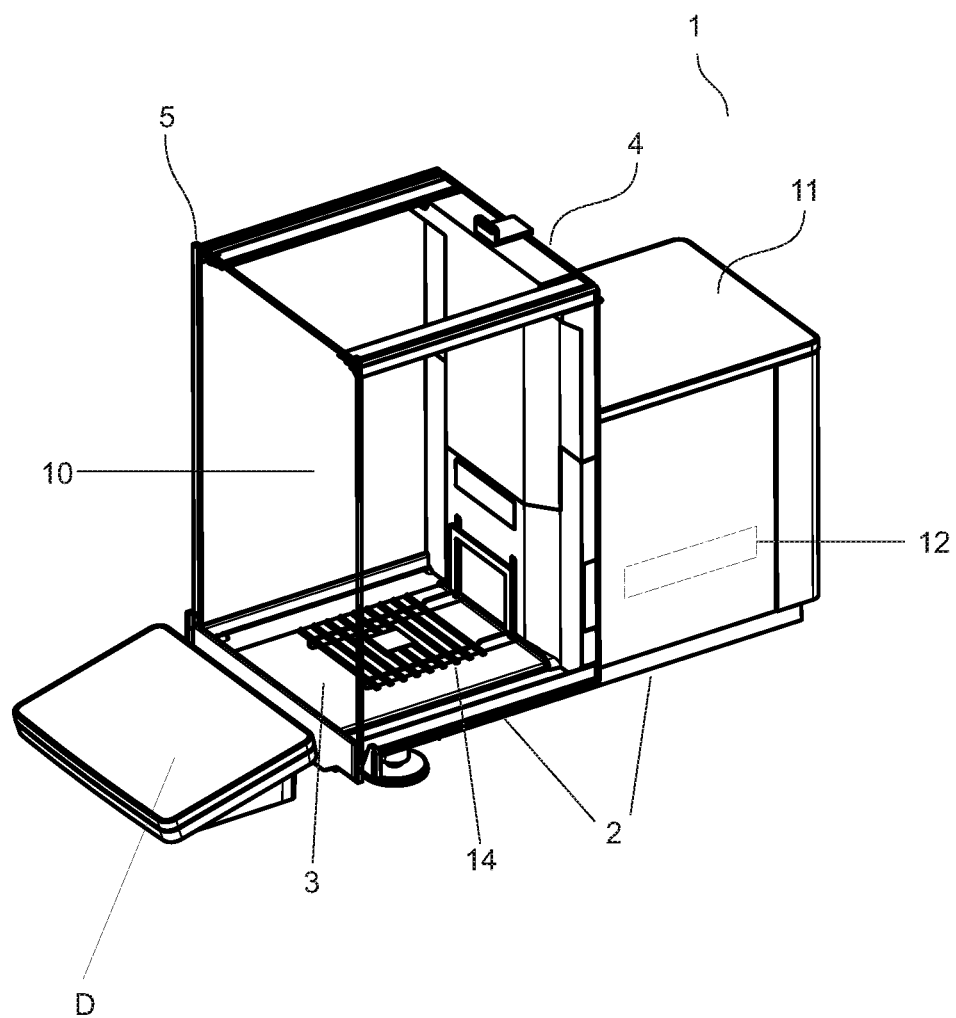
FIG. 1 illustrates a first embodiment of a laboratory balance with a weighing chamber having a rear wall according to the invention.

FIG. 1 illustrates a laboratory balance 1 according to the invention in a three-dimensional view. The principal parts of the laboratory balance 1 are the display console D, the base body 2, the weighing chamber 10, and the housing 11. The weighing pan 14, shown here as a grate-shaped weighing platform 14, is enclosed inside the weighing chamber 10. The weighing platform 14 is mechanically connected to the weighing cell 12 which is enclosed and blocked from view by the housing 11. The weighing chamber 10 is joined to the base body 2 through the weighing chamber floor 3, to the housing 11 through the weighing chamber rear wall 4, and closed off against the ambient air space by the transparent draft shield 5.

Figure 2:
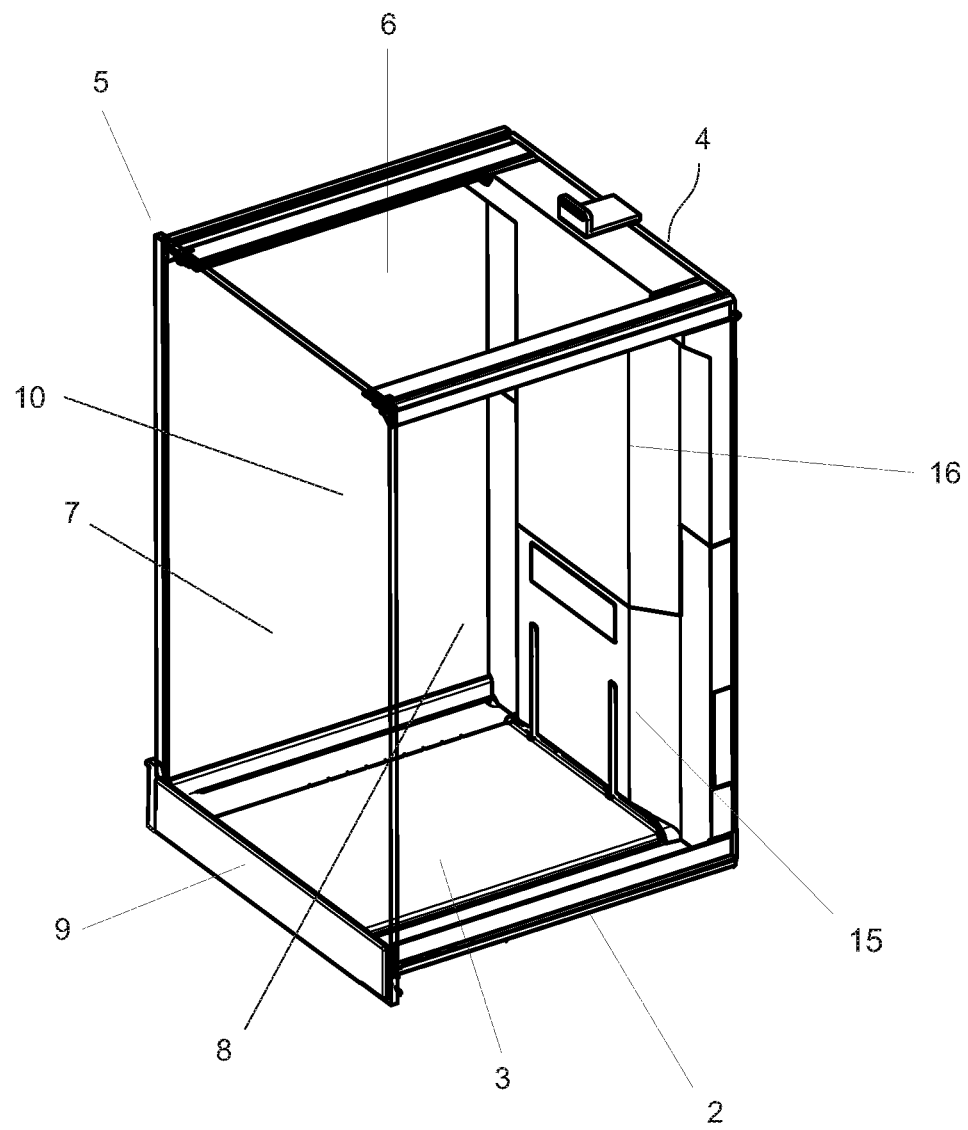
FIG. 2 shows the weighing chamber of the laboratory balance of FIG. 1.

FIG. 2 shows the weighing chamber 10 by itself in a first embodiment of the invention, wherein the weighing chamber rear wall 4 is of modular construction, with a base module 15 and a top module 16. The walls of the draft shield 5, normally in the form of rectangular transparent glass panels, include a top wall 6, a left sidewall 7, a right sidewall 8, and a front wall 9. The base module 15 of the weighing chamber rear wall 4 is connected to the base body 2, while the top module 16 is connected to the top wall 6 of the draft shield 5.

Figure 3A:
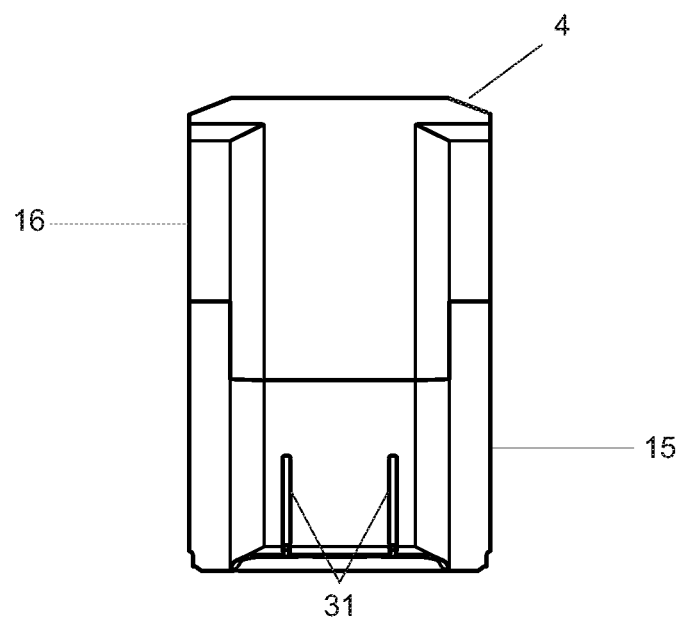
FIG. 3A represents the front side of the weighing chamber rear wall of FIG. 2 in its assembled state.
Figures 3B, 3C:
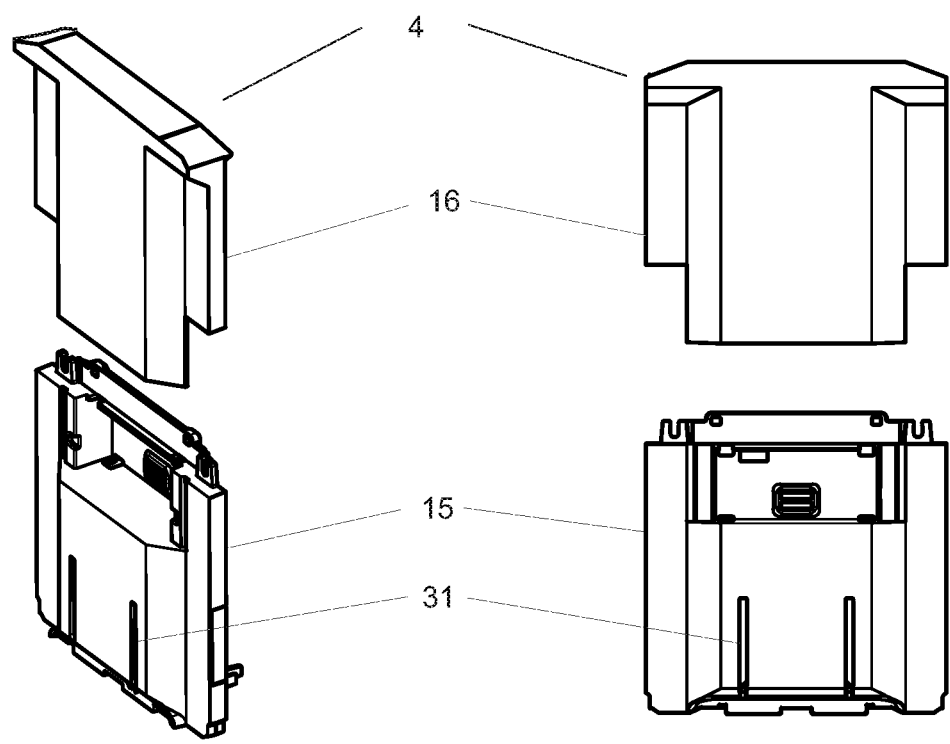
FIG. 3B shows the forward-facing side of the weighing chamber rear wall of FIG. 2 with the top module and the base module separated from each other, in a perspective view.
FIG. 3C shows the front side of the weighing chamber rear wall of FIG. 2 with the top module and the base module separated from each other.

FIG. 3A shows the weighing chamber rear wall 4 of FIG. 2 in its assembled state as seen from the front, i.e. from the side of the draft shield 5. The vertical slits 31 in the base module are openings for the contact-free passage of the aforementioned mechanical connections through which the weighing force is transmitted from the weighing pan 14 to the weighing cell 12. The perspective view of FIG. 3B is directed at the forward-facing side of the same weighing chamber rear wall 4 with the top module 16 and the base module 15 separated from each other. This drawing illustrates in particular how the top module 16 is designed so that a lower portion of the top module 16 will partially overlap an upper portion of the base module 15. As is further evident in the perspective view of the weighing chamber rear wall 4 in FIGS. 1, 2, and 3B, the front sides of the top module 16 and base module 15 have matching surface profiles, so that there is a flush transition across the parting joint. FIG. 3C shows the front side of the same weighing chamber rear wall 4 with the top module 16 and the base module 15 separated from each other.

Figure 4:
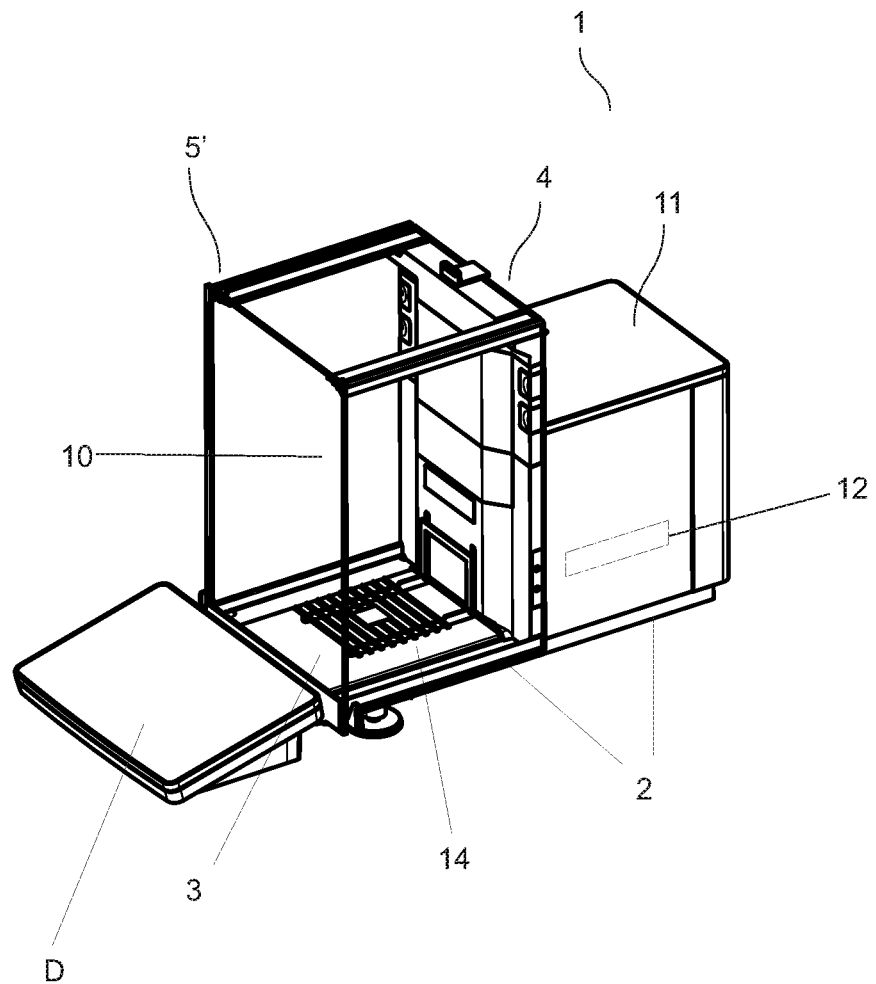
FIG. 4 illustrates a second embodiment of a laboratory balance with a weighing chamber having a rear wall according to the invention.
Figure 5:
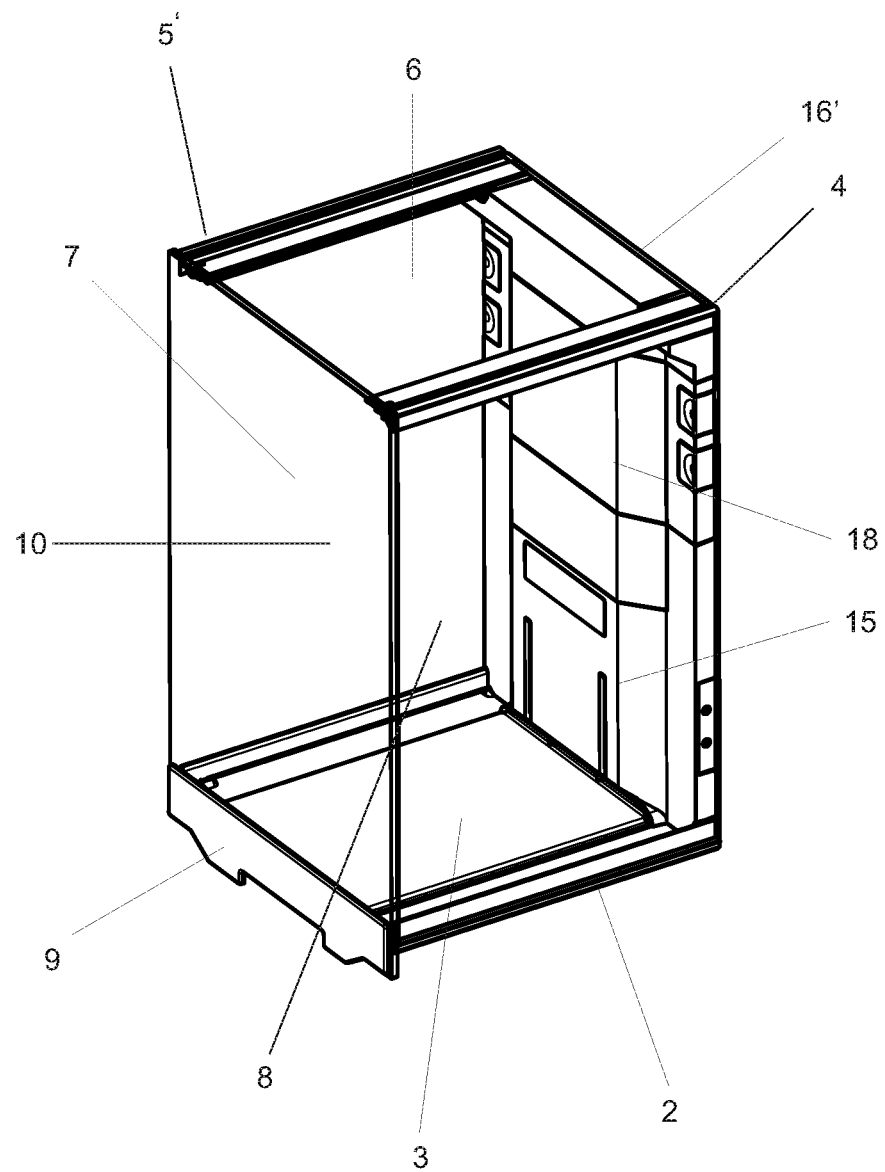
FIG. 5 shows the weighing chamber of the laboratory balance of FIG. 4.

FIG. 4 illustrates a laboratory balance 1 analogous to FIG. 1, but incorporating a second embodiment of a modular weighing chamber rear wall 4 which uses the same base module 15, but wherein an additional module 18 (see FIG. 5) is inserted between the base module 15 and a top module 16', so that a draft shield 5', whose height may be different from the draft shield 5 of FIGS. 1 to 3, can be accommodated.

Figure 6A:
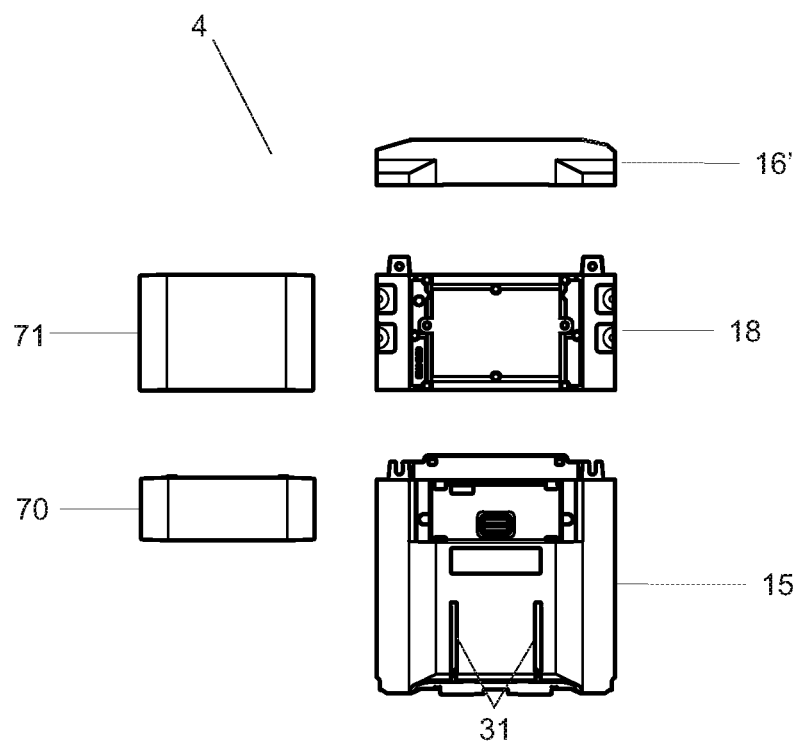
FIG. 6A shows the front side of the top module, the additional module and the base module of the weighing chamber rear wall of FIG. 5, as well as the covers for the additional module and the base module.
Figure 6B:
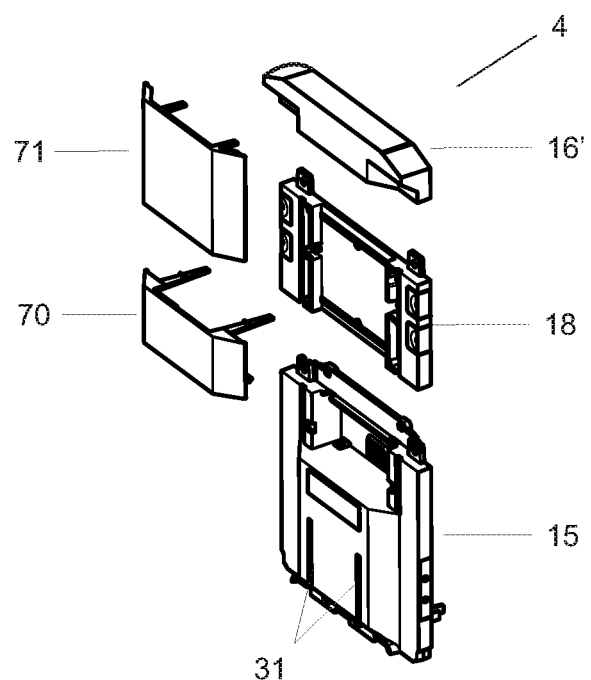
FIG. 6B shows the forward-facing sides of the top module, the additional module and the base module of the weighing chamber rear wall of FIG. 5, as well as the covers for the additional module and the base module, in a perspective view.
Figure 7:
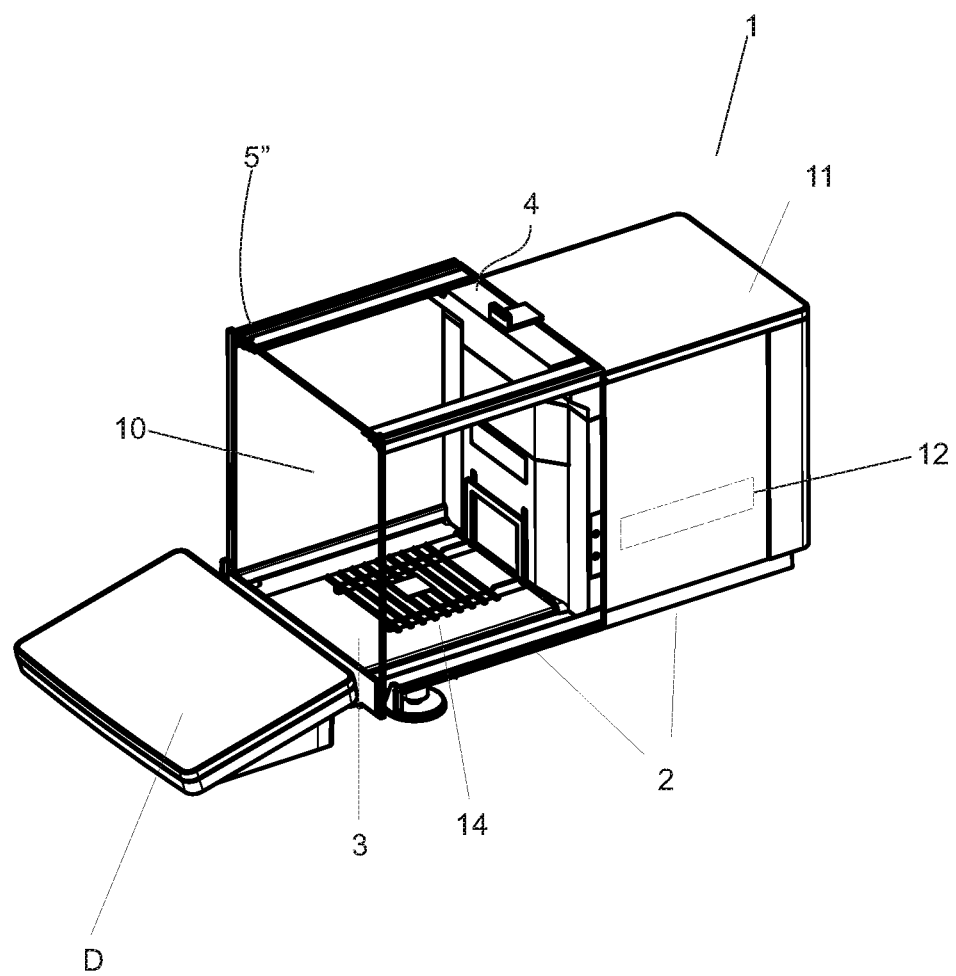
FIG. 7 illustrates a third embodiment of a laboratory balance with a weighing chamber having a rear wall according to the invention.
Figure 8:
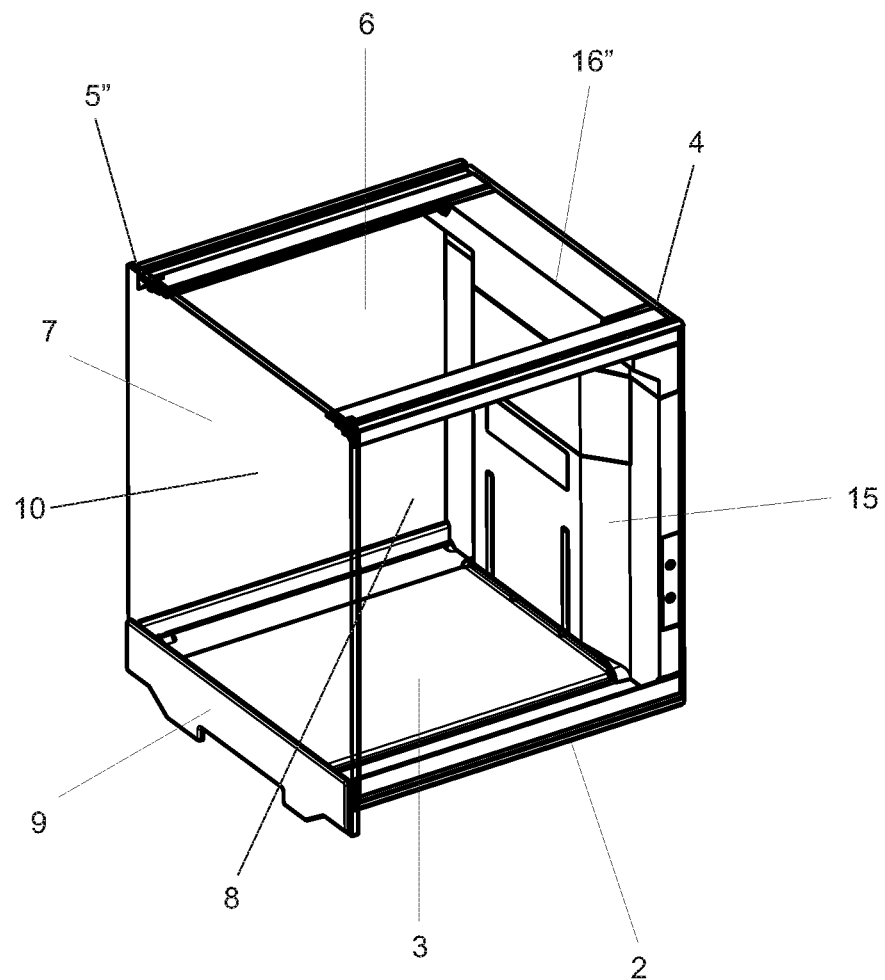
FIG. 8 shows the weighing chamber of the laboratory balance of FIG. 7.
Figure 9A:
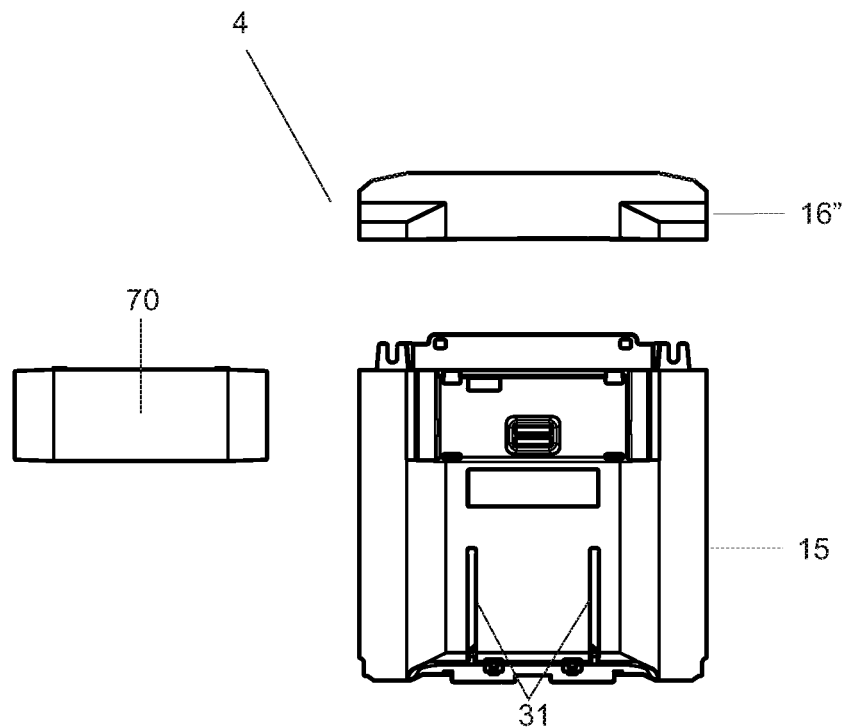
FIG. 9A shows the front sides of the top module, the base module, and the cover for the base module of the weighing chamber rear wall of FIG. 8.
Figure 9B:
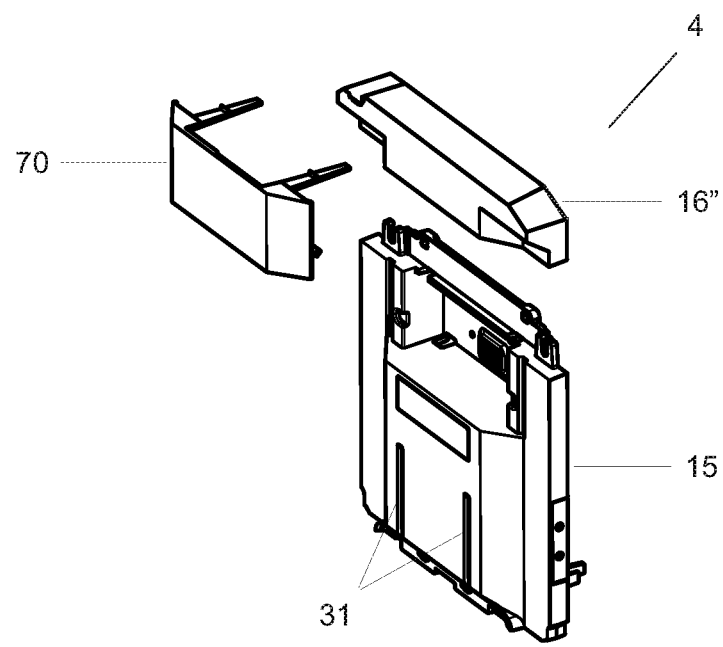
FIG. 9B shows the forward-facing sides of the top module, the base module, and the cover for the base module of the weighing chamber rear wall of FIG. 8, in a perspective view.

The components that make up this second embodiment of a modular rear wall 4 of the weighing chamber 10 are illustrated in FIG. 6A in a view from the front, and in FIG. 6B, which shows the front side of the same set of components seen at an angle from above and from the right. Instead of the configuration of the first embodiment of FIGS. 1 to 3, where a downward-extending portion of the top module 16 overlaps the base module 15 and thereby covers a recess in the latter, the additional module 18 and the top module 16' have no such downward-extending portions. Instead, the recess in the base module 15 is closed by a cover 70, and a recess in the additional module is closed by a cover 71.

FIGS. 7, 8, 9A and 9B illustrate how the inventive concept of a modular weighing chamber rear wall 4 of the weighing chamber 10 allows the laboratory balance 1 of FIG. 4 to be fitted with a draft shield 5" of lower height than the draft shield 5'. Using the same base module 15 and a top module 16" that fits equally on the base module 15 as on the additional module 18, rear walls 4 of two different heights can be manufactured from a single set of modules 15, 16", 18 and covers 70, 71 simply by either including or leaving out the additional module 18 and cover 71. The additional procurement and stock-keeping costs for the lower front and sidewall panels of the draft shield 5" will in any event be substantially less than the costs for manufacturing a single-piece weighing chamber rear wall in different heights. Furthermore, the modules of modular weighing chamber rear wall 4 can be configured depending on the type of application for which the balance is used.

While the invention has been described through the presentation of specific embodiments of a weighing chamber rear wall of modular construction, it is considered self-evident that numerous additional variants are encompassed by the teachings of the present invention, including modular weighing chamber rear walls with a larger number of wall modules, with different designs of the wall modules, or with additional elements and features added to any of the wall modules. Such combinations and variations of the modular concept for a weighing chamber rear wall described and claimed herein are considered without exception to fall within the scope of protection that is hereby sought for the present invention.

What is claimed is:

1. A laboratory balance, comprising:
   a base body;
   a weighing chamber, with a weighing chamber floor and a weighing chamber rear wall; and
   a draft shield, with a top wall, a first side wall, a second side wall arranged parallel to the first side wall, and a front wall,
   wherein the weighing chamber floor, the draft shield and the weighing chamber rear wall co-act to enclose the weighing chamber, and
   wherein the weighing chamber rear wall comprises a base module that is connected to the base body, and a top module that is connected to the top wall of the draft shield.

2. The laboratory balance of claim 1, wherein the base module and the top module co-act to form the weighing chamber rear wall.

3. The laboratory balance of claim 2, wherein the weighing chamber rear wall formed by the base module and the top module has at least one smooth surface in vertical direction.

4. The laboratory balance of claim 1, wherein the base module has a width that is equal to or exceeds a width of the base body.

5. The laboratory balance of claim 1, wherein the base module has a width that is smaller than a width of the base body.

6. The laboratory balance of claim 1, wherein the base module is positioned normal to the base body.

7. The laboratory balance of claim 1, wherein the base module and the top module each has a front surface profile, in cross-sectional planes that run parallel to the weighing chamber floor, the respective front surface profiles being identical.

8. The laboratory balance of claim 1, wherein the top module is positioned above the base module.

9. The laboratory balance of claim 1, wherein the top module is positioned in front of the base module such that the top module overlaps the base module.

10. The laboratory balance of claim 1, further comprising:
    at least one further module, arranged in the weighing chamber rear wall, between the base module and the top module.

11. The laboratory balance of claim 10, wherein the top module, the at least one further module and the base module co-act to form the weighing chamber rear wall.

12. The laboratory balance of claim 10, wherein the base module, the top module and each said further module has a front surface profile, in cross-sectional planes that run parallel to the weighing chamber floor, the respective front surface profiles being identical.

13. The laboratory balance of claim 1, wherein the top module of the weighing chamber rear wall is replaceable by a top module of a different height.

14. The laboratory balance of claim 1, wherein the draft shield is replaceable by a draft shield of different height commensurate with the total height of the weighing chamber rear wall.

15. The laboratory balance of claim 3, further comprising:
    at least one further module, arranged in the weighing chamber rear wall, between the base module and the top module.

16. The laboratory balance of claim 15, wherein the top module, the at least one further module and the base module co-act to form the weighing chamber rear wall.

17. The laboratory balance of claim 15, wherein the base module, the top module and each said further module has a front surface profile, in cross-sectional planes that run parallel to the weighing chamber floor, the respective front surface profiles being identical.

* * * * *